(No Model.)
C. A. RODNEY.
COMPOSITE WASHER.
No. 269,119.  Patented Dec. 12, 1882
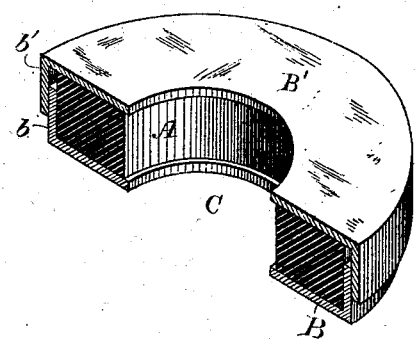
WITNESSES
Wm A. Skinkle
Jas. S. Latimer
INVENTOR,
Caesar A. Rodney,
By his Attorneys
Baldwin, Hopkins & Payton.

UNITED STATES PATENT OFFICE.

CAESAR A. RODNEY, OF WILMINGTON, DELAWARE.

COMPOSITE WASHER.

SPECIFICATION forming part of Letters Patent No. 269,119, dated December 12, 1882.

Application filed October 16, 1882. (No model.)

*To all whom it may concern:*

Be it known that I, CAESAR A. RODNEY, of Wilmington, in the county of New Castle and State of Delaware, have invented certain new and useful Improvements in Composite Washers, of which the following is a specification.

My invention relates to the class of composite washers particularly useful as locks for bolt-nuts which have an elastic ring or body inclosed in a metal casing.

The object of my invention is to provide an improved composite washer of the type mentioned, which is not only simpler than those which have preceded it, as far as I am aware, but which is also more durable and effective in its operation.

My said invention consists of a washer composed of an elastic or compressible ring or body seated in a stiff metal cup, the rim of which is fitted into the rim of another stiff metal cup, so as to be held therein by friction with the elastic ring or body contained within and between said cups, the said cups being capable of telescoping or sliding one within the other without rigid obstruction when subjected to pressure which compresses the inclosed compressible ring or body.

The accompanying drawing represents a sectional perspective view taken through the center of one of my improved washers.

An elastic or compressible ring or body, A, is seated in a stiff metallic cup, B, so that the rim $b$ of said cup surrounds the periphery of said ring or body. The depth of the rim $b$, however, is less than the thickness of said ring or body A, and it is fitted into the rim $b'$ of another stiff metallic cup, B', said rim $b'$ of the cup B' being likewise preferably of less depth than the thickness of the elastic ring A.

The rims of the two cups B B' are fitted one into the other sufficiently tight to be held together by friction with the ring or body A contained within and between the cups, while the cups are capable under pressure of telescoping or sliding one within the other without obstruction from rigid contact, so as to permit the elastic body A to be compressed without permitting it to spread under compression.

The improved washer is provided with the usual bolt-hole or opening, C, to permit the washer to be passed on over the bolt in advance of the nut. As the nut is screwed home upon the bolt it will bear against the outer side of the composite washer, while the inner side thereof will be forced against the surface—for instance, the fish-plate connecting the adjacent ends of track-rails, through which the bolt is passed. As the screwing home of the nut is continued the stiff metal cups will telescope or slide one within the other under the pressure, and will compress the elastic ring or body A, which cannot spread laterally, as it is firmly retained by the double walls formed by the overlapping rims of the containing-cups. When the limit of compression is reached or the nut has been firmly screwed up, said nut will be firmly locked upon its bolt by the elasticity of the ring or body A, which will press with such force through its containing-cup upon the nut as to prevent said nut from turning.

I prefer the stiff metal cups B B' to be of comparatively thin steel and the inclosed elastic body or ring to be of the material now well known in the arts as "vulcanized" fiber. Vulcanized fiber, by its tenacity, strength, durability, elasticity, and comparative economy, is especially desirable as the inclosed ring or body of my improved composite washer, and particularly when said washers are applied to the bolts of railway-track joints—for instance, where the washers are subjected to heavy and unequal pressure.

I claim as my invention—

The improved composite washer, consisting of a compressible ring or body contained within stiff telescoping metal cups, said cups being united together with the compressible ring between them by the frictional contact of interfitting rims, substantially as described, whereby, while the cups are capable of telescoping one within the other under the compression of the nut, there is at the same time a double wall to prevent spreading of the inclosed elastic body.

In testimony whereof I have hereunto subscribed my name this 14th day of October, A. D. 1882.

C. A. RODNEY.

Witnesses:
WM. J. PEYTON,
LLOYD B. WIGHT.